No. 846,314. PATENTED MAR. 5, 1907.
H. M. KABELE.
MATCH BOX.
APPLICATION FILED JUNE 8, 1906.
2 SHEETS—SHEET 1.
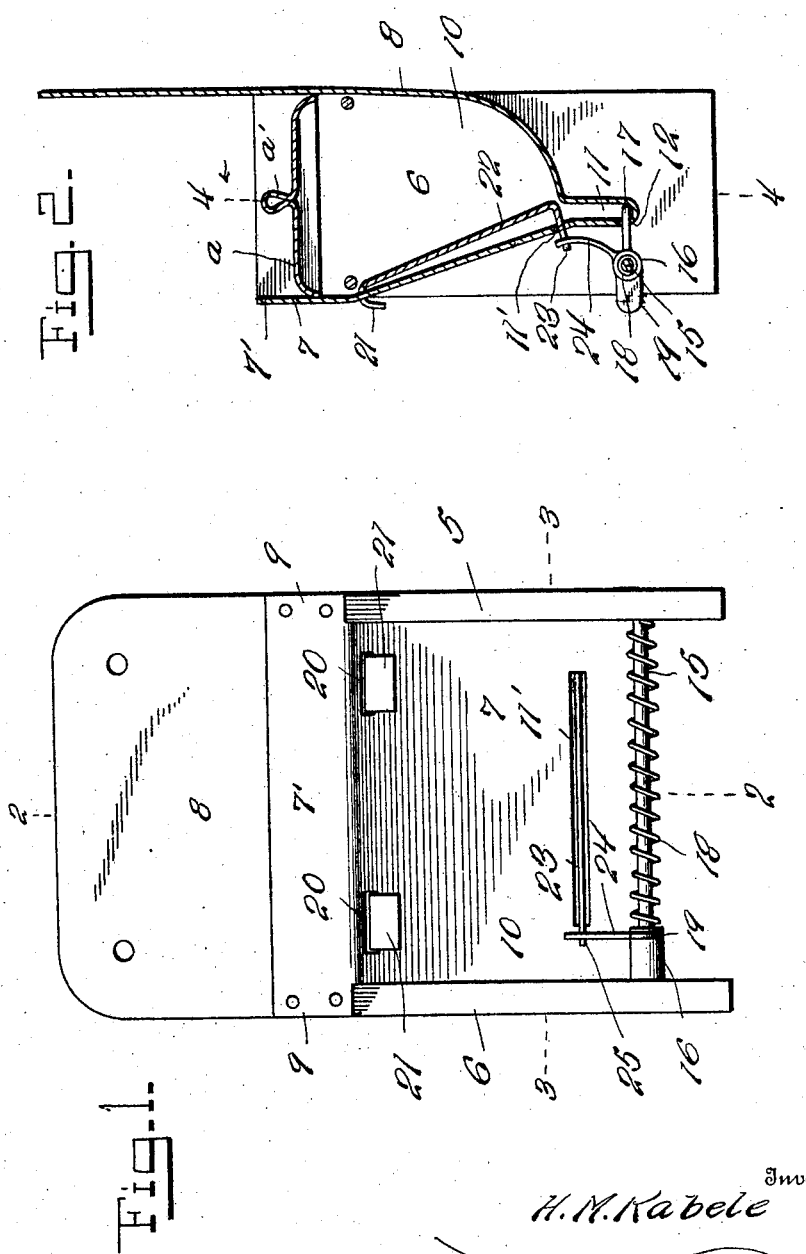

No. 846,314. PATENTED MAR. 5, 1907.
H. M. KABELE.
MATCH BOX.
APPLICATION FILED JUNE 8, 1906.

2 SHEETS—SHEET 2.

Witnesses
G. R. Thomas
F. B. MacNab

Inventor
H. M. Kabele
By Chandlee & Chandlee
Attorneys

UNITED STATES PATENT OFFICE.

HENRY M. KABELE, OF WESTFORD, MASSACHUSETTS.

MATCH-BOX.

No. 846,314.  Specification of Letters Patent.  Patented March 5, 1907.

Application filed June 8, 1906. Serial No. 320,844.

*To all whom it may concern:*

Be it known that I, HENRY M. KABELE, a citizen of the United States, residing at Westford, in the county of Middlesex, State of Massachusetts, have invented certain new and useful Improvements in Match-Boxes; and I do hereby declare the following to be a full, clear, and exact description of the invention, such as will enable others skilled in the art to which it appertains to make and use the same.

This invention relates to match-boxes, and more particularly to single-delivery boxes, and has for its object to provide a box which will be arranged to deliver one match at a time and which will be constructed to prevent jamming or wedging of the matches within the box.

Another object is to provide a box which will be simple and which may be produced at a low cost.

Other objects and advantages will be apparent from the following description, and it is to be understood that I do not desire to be limited to the exact details of construction shown and described, for obvious modifications will occur to a person skilled in the art.

Figure 3:
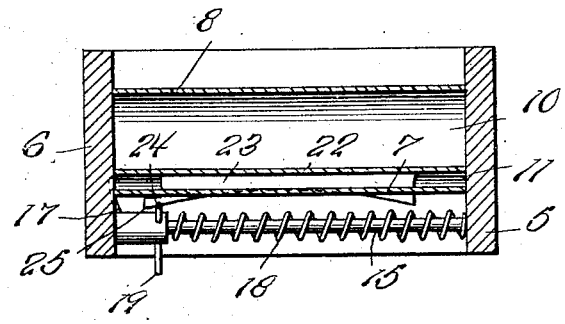
Figure 4:
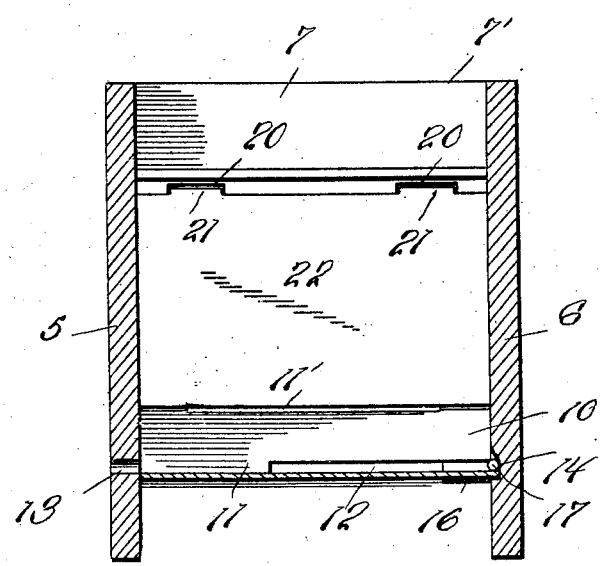

In the drawings forming a portion of this specification, and in which like numerals of reference indicate similar parts in the several views, Figure 1 is a front elevation of the box. Fig. 2 is a transverse section on line 2 2 of Fig. 1. Fig. 3 is a horizontal section on line 3 3 of Fig. 1, showing the formation of the flap-lip. Fig. 4 is a longitudinal section on line 4 4 of Fig. 2.

Referring now to the drawings, the present invention comprises a body portion including ends 5 and 6, which also form feet for the support of the box, and front and rear walls 7 and 8, these two walls being formed of a continuous piece of metal bent upon itself and having tabs 9 adjacent to its end portion, which are secured against the edges of the ends 5 and 6, the portions of the metal between these tabs lying between the ends. There is thus formed a receptacle 10, and this receptacle is transversely reduced at its lower portion to form a match-receiving trap 11, adapted for the reception of a column of matches one upon another, and the rearward wall 8 is curved downwardly to this trap to direct matches thereinto. The upper portion of the wall 7 is straight, as shown at 7'; but the intermediate portion thereof is slanted inwardly and downwardly to the trap trap to direct matches to the latter.

A horizontal slot 11' is formed in the wall 7 just above the trap 11 for a purpose to be presently described, and a second horizontal slot 12 is formed in the lower portion of the wall 7, which forms one wall of the trap 11, this slot 12 extending to one end of the trap and terminating short of the other end thereof, and the end of the trap to which this slot extends is that end which is closed by the end 6 of the body portion. The end 5 of the body portion has an opening 13 therein communicating with the trap 11 at the lower portion thereof for the outward passage of matches from the trap, and formed in the inner surface of the end 6 of the body portion at the opposite end of the trap from the opening 13 there is a recess 14.

A horizontal rod 15 is mounted between the ends 5 and 6 forwardly of the wall 7, and mounted upon this rod there is a slide 16, having a finger 17 extending through the slot 12 into the trap 11, and a helical spring 18 is engaged between this slide and the end 5 of the body portion to hold the slide yieldably against the end 6 and with its finger 17 in the recess 14, and thus out of the trap 11, but in position to engage against the end of a match lying in the bottom of the trap. The lodging of matches upon the finger 14 is thus prevented.

A forwardly-extending thumb-piece 19 is carried by the slide 16 and may be engaged by the thumb of a hand, the first and second fingers of which rest against the outer surface of the end piece 5 at opposite sides of the opening 13, and it will be apparent that movement of the slide by the thumb toward the end piece 5 will project a match through the opening 13 and in position to be grasped between the fingers. The forward wall 7 below its straight portion 7' is provided with a pair of horizontally-alining slots 20, in which are loosely engaged a pair of downwardly-bent ears 21, carried by a flap 22, which extends downwardly within the chamber 10 in position to rest against the slanting portion of the wall 7. At its lower end this flap has a lip 23, turned to extend forwardly through the slot 11', and the slide 16 has an upwardly-extending projection 24, arranged to rest against the forward edge of this lip at the portion thereof adjacent to the end 6 of the body portion to hold the flap inwardly in spaced relation to the wall 7 and in position to extend over the trap 11.

Between its ends the lip 23 is cut away, the ends of the cut-away portion converging inwardly, so that when the slide 16 is moved this cut-away portion will permit the flap to move against the wall 7, further movement of the slide bringing the projection 24 into engagement with the end portion of the lip adjacent to the end 5 and moving the flap inwardly again.

A projection 25 is carried by one end of the lip and extends beyond one end of the slot 11' to prevent disengagement of the lip from the slot, and it will be seen that this flap 22 forms an agitator which disturbs the matches upon each operation of the slide in order to insure their falling into the trap.

As will be seen, when the slide has been moved to its farthest limit against the action of the spring 18 the flap 22 has been again moved inwardly to project over the trap 11, and should the outer end of the match be moved downwardly the flap will prevent upward movement of the inner end of the match, which might result in jamming of the match between other matches and the sides of the trap.

A lid $a$ may be disposed upon the matches within the box and has a central portion bent upwardly, as shown at $a'$, to form a finger-piece. The weight of this lid will serve to move the matches downwardly.

It will of course be understood that the match-box may be made in different forms within the scope of the claims.

What is claimed is—

1. A match-box comprising a body portion having a chamber therewithin provided with a trap at its bottom, and having a match-discharge opening communicating with the trap, a slide, a finger carried by the slide and lying in position for engagement by a match within the trap to move said match outwardly through the opening when the slide is moved, an agitator located within the chamber for movement into and out of position to cover the trap, and means connected with the slide and arranged to hold the agitator normally in position to cover the trap and arranged for movement to permit of movement of the agitator out of such position when the slide is moved, said means being arranged to hold the agitator in normal position when the slide is in match-projecting position.

2. A match-box comprising a body portion having a chamber therewithin and having a match-discharge opening, a slide having a finger movable into the body portion for engagement of matches therewithin successively to project them through the discharge-opening, means for holding the slide with the finger yieldably in match-engaging position, an agitator within the chamber and having a lip provided with a recess in its free edge, and a projection carried by the slide and engaging the free edge of the lip, to hold the agitator against movement, said projection being movable with the slide into position to enter the recess to permit of movement of the agitator.

3. A match-box comprising a body portion having a chamber therewithin provided with a trap at its bottom and having a match-discharge opening at one end of the trap, said trap having a recess in its end wall opposite to the discharge-opening, and having a longitudinal slot at its lower portion, said body portion having a horizontal slot above the trap, a rod mounted horizontally exteriorly of the body portion, a slide mounted upon the rod and having a finger extending through the slot of the trap and in position to enter the recess, a spring engaged with the rod and arranged to hold the slide with its finger normally in the recess, an agitator pivoted to the wall of the body portion above the horizontal slot, for movement into and out of position to cover the trap, said agitator having a lip extending outwardly through the slot and having a cut-away portion in its outer edge between its ends, a projection carried by the lip and arranged to prevent disengagement of the lip from the slot, and a projection carried by the slide and engaging the outer edge of the lip, said projection being arranged to hold the agitator in position to cover the trap when at the ends of the lip, and in position to permit of movement of the agitator out of trap-covering position when between the ends of the lip or in the cut-away portion.

In testimony whereof I affix my signature in presence of two witnesses.

HENRY M. KABELE.

Witnesses:
GRACE CROWLEY,
ALBERT M. MOORE.